US011150684B2

(12) United States Patent
Spiteri (10) Patent No.: US 11,150,684 B2
(45) Date of Patent: Oct. 19, 2021

(54) ROTATION DETECTING JOYSTICK (71) Applicant: Methode Electronics Malta Ltd., Mriehel (MT)

(72) Inventor: Matthew Spiteri, Zejtun (MT)

(73) Assignee: METHODE ELECTRONICS MALTA LTD., Mriehel (MT)

( * ) Notice: Subject to any disclaimer, the term of this patent is extended or adjusted under 35 U.S.C. 154(b) by 472 days.

(21) Appl. No.: 16/001,620

(22) Filed: Jun. 6, 2018

(65) Prior Publication Data

US 2018/0356854 A1 Dec. 13, 2018

(30) Foreign Application Priority Data

Jun. 7, 2017 (DE) .................... 10 2017 112 545.0

(51) Int. Cl.
*G05G 9/047* (2006.01)
*G05G 5/03* (2008.04)
*G01D 5/14* (2006.01)
*G01D 5/26* (2006.01)
*H01F 7/02* (2006.01)

(52) U.S. Cl.
CPC ............. *G05G 9/047* (2013.01); *G01D 5/145* (2013.01); *G01D 5/26* (2013.01); *G05G 5/03* (2013.01); *H01F 7/02* (2013.01); *G05G 2009/04714* (2013.01); *G05G 2009/04755* (2013.01); *G05G 2009/04759* (2013.01); *G05G 2009/04766* (2013.01)

(58) Field of Classification Search
CPC ........ H01H 25/04; H01H 25/041; G05G 5/05; G05G 5/03; G05G 9/047; G05G 2009/04714; G05G 2009/04755; G05G 2009/04759; G05G 2009/04766; G05G 2009/04744; G01D 5/145; G01D 5/26; H01F 7/02
See application file for complete search history.

(56) References Cited

U.S. PATENT DOCUMENTS

| 2008/0245650 | A1* | 10/2008 | Kramlich | ............... | G05G 9/047 |
| | | | | | 200/6 A |
| 2009/0084214 | A1 | 4/2009 | Sakai et al. | | |
| 2015/0377648 | A1* | 12/2015 | Sirohiwala | ............. | G01D 5/165 |
| | | | | | 324/207.2 |

FOREIGN PATENT DOCUMENTS

| DE | 3504387 A1 | 8/1985 |
| DE | 102006014923 A1 | 10/2007 |

(Continued)

*Primary Examiner* — Luis A Gonzalez
(74) *Attorney, Agent, or Firm* — Thompson Coburn LLP (57) ABSTRACT

A joystick includes a stick and a base attached to the stick. The joystick includes a housing in which part of the base is disposed. The housing includes a baseplate. A predetermined number of magnets correspond to the number of pivot-axes. The magnets are attached to the base, and each of the magnets defines a pivot-axis around which the base can be. The pivot-axis is defined by one of the magnets diametrically opposite to this magnet. A magnetic element, in particular a plate, is attached to or is part of the baseplate. The joystick further includes a sensor for detecting rotation of the base around at least one of the predetermined number of pivot-axes. The base and the magnets attached to the base are disposed facing the magnetic element and interacting with the magnetic element such that an attractive force is pulling the magnets toward the magnetic element.

18 Claims, 3 Drawing Sheets

(56) References Cited

FOREIGN PATENT DOCUMENTS

DE 102014108195 A1 1/2015
JP 2011258389 A * 12/2011 ........... H01H 25/041

* cited by examiner

ROTATION DETECTING JOYSTICK

CROSS-REFERENCE TO RELATED APPLICATIONS

This application claims priority to German patent application number DE 10 2017 112 545.0, filed on Jun. 7, 2017, the entirety of which is hereby incorporated by reference herein.

STATEMENT REGARDING FEDERALLY SPONSORED RESEARCH OR DEVELOPMENT

Not Applicable.

APPENDIX

Not Applicable.

BACKGROUND

Field

This disclosure pertains to a joystick for detecting rotation.

General Background

Joysticks have been used in the past in many fields. In the 1980's, for example, joysticks have been widely used for controlling computer-games or other applications.

In the recent years joysticks are more and more used in automobiles for controlling several functions of said automobiles. Generally such joysticks are provided in the cars for handling navigation systems, radios, mobile telephones, and for adjusting the settings of the respective cars.

In order to navigate for example through a menu of an application the joystick is provided to detect a movement (generally a rotation) of a stick around one or more (generally four) pivot-axis/axes. The movement is generally performed against the force of an elastic element which is arranged in the joystick. The detected movement is then used for a navigating through the menu, e.g. to move down in a list of items or to move up, to the left or to the right.

An embodiment of a joystick known in the state of the art is disclosed in the German patent application DE 10 2014 108 195 A1. This joystick is a multidirectional actuator device which includes an operating member having a columnar operating shaft capable of performing a tilting movement and performing a tilting movement together with the operating member along one single pivot axis. The tilting movement pivots the operation shaft from its center, which is inboard of a plurality of magnets. The magnets on the sides of the operating shaft provide operating shaft forces.

However, a disadvantage of this solution is that it does not enable movement of the joystick in a single direction of pivot at one time. Therefore, this solution needs to have an additional component to restrain the number of movements. Since it is the operating member only which provides one single pivot-axis by pivoting the operation shaft from its center this leads to spongy haptics for the user and the design does not transmit exactly the forces which act on the operating member. This is a due to the locationof the magnets which are located outboard of the operating member.

A further disadvantage of this construction is that at a zero position (when the stick is not rotated around any pivot-axis) some free play occurs when the joystick is touched lightly. For example, there may be 0.1 to 0.4 millimeters of free play. From the technical point of view this is not a real free play, but is caused by the fact that at the zero position the preload of the stick is as low as approximately 0.4 newton to 0.6 newton what gives the user the feeling of experiencing a free play.

Considering the above mentioned drawbacks of joysticks according to the prior art, it is an object of this disclosure is to provide a joystick that provides for no or more limited free play when the stick is in its zero position. A further object of this disclosure is to provide a joystick that has uniform haptic feedback on the joystick regardless the direction the joystick is moved in.

SUMMARY

One aspect of the disclosure is related to a joystick for detecting rotation around a predetermined number of pivot-axes. The joystick includes a stick, a base, where the stick is attached to the base, and a housing in which at least part of the base is disposed. The housing includes a baseplate. The joystick further includes at least one magnet. The joystick has a number of pivot-axes greater than one, where for each pivot axis rotation of the joystick about the pivot axis is detected. The one or more magnets is/are attached to the base and the one or more magnets each define one pivot-axis of the number of pivot-axes around which the base can be rotated relative to the housing. Each of the pivot-axes is opposite the respective magnet. The joystick further includes a magnetic element, in particular a plate, which is made of a magnetic material. The magnetic element is attached to, or is part of, or constitutes the baseplate of the housing. The joystick further includes at least one sensor for detecting the rotation of the base around at least one of the predetermined number of pivot-axes. The base and the at least one magnet or the number of magnets attached to the base is/are disposed facing the magnetic element and interacting with the magnetic element such that an attractive force is pulling the magnets toward the magnetic element. Synonyms for the term stick are e.g. shaft, operating member, bar. In one (first) embodiment of the joystick there is a number, i.e. multitude, of magnets, the predetermined number of magnets being arranged outside of the stick and corresponding to the number, i.e. multitude, of pivot-axes around which a detection of rotation shall be performed.

In another (second) embodiment of the joystick there is one single magnet which is advantageously arranged coaxially within the stick. Also in this embodiment the one single magnet corresponds to a number, i.e. multitude, of pivot-axes around which a detection of rotation shall be performed. This (second) embodiment leads to even better, particularly uniform, haptics of the joystick because it avoids effects of influencing the haptics due to different values of force (pull force) of each single magnet which is subject to normal fabrication tolerances.

Both of the embodiments have in common that the number of pivot-axes are located diametrically opposite to the one magnet or to the number of magnets. Both of the embodiments will, thus, be described in a uniform way unless different constructional features require a differentiation.

In both embodiments, the stick and the base are kept in its zero-position by one or more magnets which are drawn towards the magnetic element. This means that an initial force needed to lift the magnet away from the magnetic element (when a rotation around a pivot axis is performed, the stick is moved into a direction lifting one magnet—the one defining the pivot-axis around which the base is rotated—from the magnetic element) is a high force, i.e. the highest force needed in the whole movement process of the stick and the base. Therefore, the feeling of a free play in a zero-position does not occur.

In a preferred embodiment, the stick is extending along a central axis and the base includes, at least in parts, a plate-like shape. The plate-like shaped part extends in a plane, and the intersection of the central axis of the stick and the plane in which the plate-like shaped part extends defines a center point of the joystick. None of the pivot-axes contains the center point. This means that all pivot-axes are aligned decentralizedly.

The stick and the base may be made integrally and may be made of the same material, for example made of plastic, metal or aluminium. Therefore, low production expenses can be achieved.

The stick optionally includes a first end and a second end. The first end is attached to the base, and at the second end a knob is arranged rotatably around the stick. The knob is provided for detecting an amount of rotation of the knob around the stick. This gives additional degrees of freedom for controlling devices or applications. In addition to the detection of the movement direction of the stick, the amount of rotation of the knob can be detected for control of any application or device.

In the first embodiment it is preferred that the predetermined number of pivot-axes and predetermined number of magnets is identical, in particular four, six or eight. Therefore, a movement to the front, to the rear, to the left and to the right or to intermediate stages can be easily and reliably detected. Each of the number of pivot-axes interacts with a specific magnet which is lifted up when a force is applied to the stick, i.e. when the stick and the base are rotated around the corresponding pivot-axis. This means that each of the number of pivot-axes which is defined by a magnet is always the one opposite to the magnet in the direction of the force which is applied to the stick. This is an ideal construction for navigating for example through a menu of a radio or a navigation system or similar applications and devices as, for example some settings of a car etc. Another possible embodiment allows for additional movements to be obtained with less magnets. For example 4 magnets can be used for 8 movements. Alternative embodiments allow the joystick to pivot diagonally with two of the magnets providing the haptic. The force will in this case not be uniform between a N/E/S/W group (when the directions of tilting are denoted by geographic directions) and a NE/SE/SW/NW group, however such a realization ensures an economical construction.

The second embodiment differs from the first embodiment in that not a number of magnets, a multitude of magnets, is provided but rather one (single) magnet. The one magnet is advantageously arranged coaxial within the stick. In a more preferred embodiment, the magnet is located coaxially in the bottom area of the stick close to the base. Also in this embodiment, the forces for the joystick are achieved. The pivot-axes remain unchanged compared to the first embodiment. The movement of the stick to the front, to the rear, to the left, to the right or to intermediate stages is conducted in the same way as it is done with the stick according to the first embodiment. Although the second embodiment has one magnet only, each of the number of pivot-axes is related to this single magnet in a way that the pivot-axis is active which is opposite to the direction of the force which is allied to the stick.

Pivot points which support the rotation of the base around the pivot-axes may be part of the joystick. This leads to a stable construction.

With regard to both embodiments, the central axis of the stick defines an axial direction of the stick, and the stick has a radial extension from the central axis. The radial extension of the stick from the central axis in the direction of one or each one of the pivot-axes is smaller than the distance of the respective one of the pivot-axes to the center point for all points of the respective one of the pivot-axes. Alternatively or additionally, the radial extension of the stick from the central axis in the direction of at least one or each one of the pivot-axes is smaller than the smallest distance of the respective one of the pivot-axes to the central axis of the stick.

The central axis of the stick in both embodiments may define an axial direction of the knob, and the knob has a radial extension from the central axis. The radial extension of the knob from the central axis in the direction toward each one of the pivot-axes is smaller than the distance of the respective one of the pivot-axes to the center point for all points of the respective one of the pivot-axes. Alternatively or additionally, the radial extension of the knob from the central axis in the direction to each one of the pivot-axes is smaller than the smallest distance of the respective one of the pivot-axes to the central axis of the stick.

Due to the above defined radial dimensions and distances, the pivot axis is placed outside a projection of the stick and/or knob from above to the base meaning that the stick and/or knob cannot be tilted when a force parallel to the central axis of the stick and/or knob is applied and therefore no rotation of the stick/knob and the base around one of the pivot-axes will be initiated when such a force is applied.

The at least one sensor for detecting the rotation might be a Hall-sensor or an optical sensor. This ensures a precise contactless measurement.

Further optional features of the joystick are set forth in the following description of the figures. The described features can in each case be realized individually or in any desired combinations. Accordingly, the joystick is described below with reference to the drawings and on the basis of illustrative embodiments. In the drawings:

DETAILED DESCRIPTION

Figure 1:
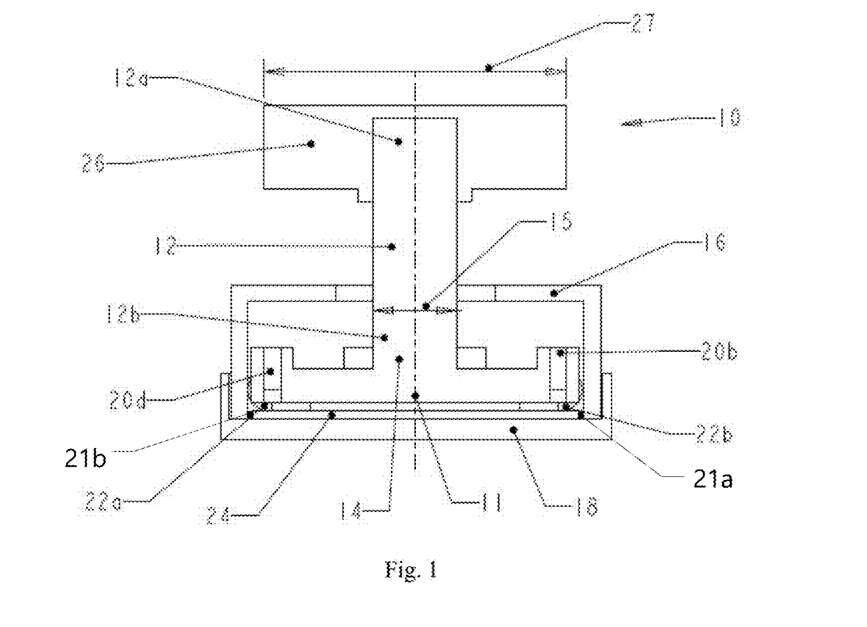
FIG. 1 shows an exemplary joystick according to a first embodiment of a joystick according in a sectional side view.

As can be seen, for example from FIG. 1, a possible embodiment of a joystick 10 includes a stick 12, and a base 14. The stick 12 is attached to the base 14. The joystick 10 further includes a housing 16 in which the base 14 is disposed. The housing 16 includes a baseplate 18.

The joystick 10 includes four magnets 20a-20d, the number of magnets corresponding to the number of pivot-axes (i.e. four pivot-axes 22a-22d) around which a detection of rotation is performed. The magnets 20a-20d are attached to the base 14, and each of the magnets 20a-20d defines a corresponding pivot-axis 22a-22d around which the base 14 can be rotated relative to the housing 16.

A magnetic element, implemented in the embodiment which is here described as a plate 24, is made of a (ferromagnetic or ferrimagnetic) magnetic material (for example a magnetic steel) and is attached to the baseplate 18 of the housing 16. In alternative embodiments, the plate 24 may be part of the baseplate 18 or may constitute the baseplate 18. The base 14 and the magnets 20a-20d attached to the base 14 are disposed facing the plate 24 and interact with the plate 24 such that an attractive force is pulling the magnets toward the plate 24. In a zero-position of the stick 12 and the base 14, i.e. in a position in which the stick 12 and the base 14 are not rotated around any one of the pivot axes 22a-22d, the magnets 20a-20d secure the base 14 safely at the plate 24.

Four sensors 21a-22d for detecting the rotation of the base around the pivot-axes 22a-22d are disposed at the baseplate 18 of the housing 16. The sensors are, in the embodiment which is described here, Hall-sensors. In alternative embodiments, any other type of sensor may be used, as for example optical sensors, etc.

Figure 3:
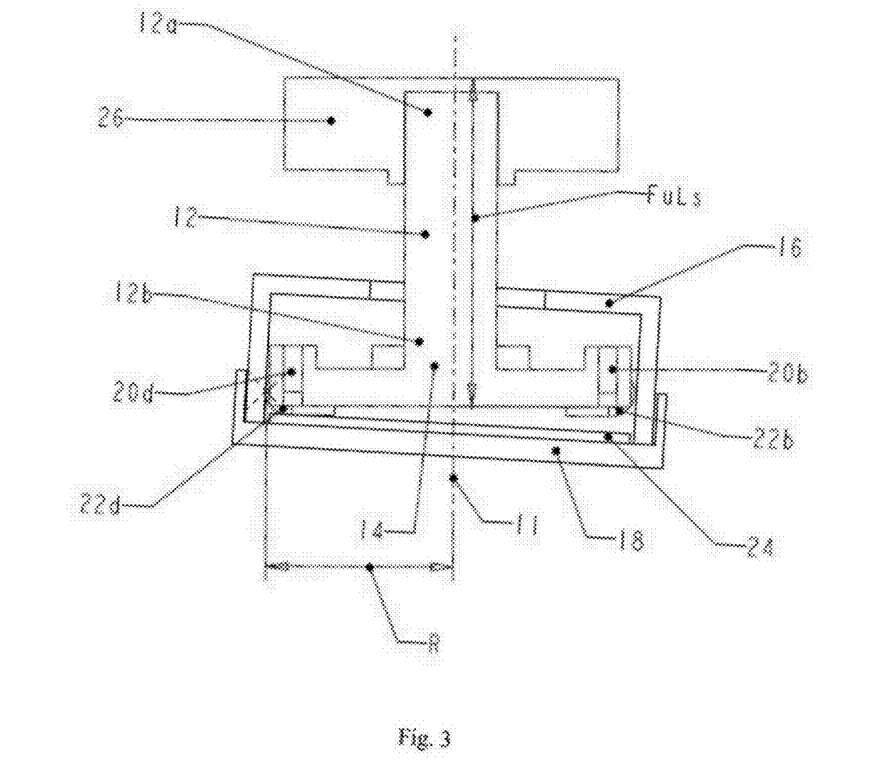
FIG. 3 shows the joystick according to FIG. 1 in in a sectional side view with a tilted stick and base.

When (e.g., as shown in FIG. 3) a force acting parallel to the base or having a component acting parallel to the base 14 (indicated by an arrow in FIG. 3) is applied to the stick 12, one of the magnets 20a-20d as well as the stick 12 are lifted up from the plate 24 and the stick 12 and the base 14 are rotated around the corresponding pivot-axis 22a-22d which is defined by the magnet 20a-20d, i.e. which corresponds to the magnet 20a-20d which is lifted up. It should be noted that the pivot-axis 22a-22d, which is defined by a magnet 20a-20d, is always the one opposite to the magnet in the direction of the force which is applied to the stick 12. If a force is applied to the stick 12 in the direction north, the magnet 20a-20d located south of the stick will be lifted up, and the stick 12 and the base 14 will be rotated around the pivot-axis 22a-22d located north of the stick 12. Since the initial force for lifting up a magnet is quite high, no feeling of a free play of the stick 12 in the zero-position can occur.

The stick 12 extends along a central axis 11 (e.g., as shown in FIGS. 1 and 3) and the base 14 includes, at least in parts, a plate-like shape. The plate-like shaped part extends in a plane. The intersection of the central axis 11 of the stick 12 and the plane in which the plate-like shaped part extends defines a center point 13 of the joystick 10. None of the pivot-axes 22a-22d contains the center point.

The stick 12 and the base 14 are formed integrally and are made of plastic or any other appropriate material. The stick 12 includes a first end 12a and a second end 12b. The second end 12b is attached to the base 14. At the first end 12a, a knob 26 is arranged rotatably around the stick 12. The knob 26 is provided for detecting an amount of rotation of the knob 26 around the stick 12. With the knob, further movements of the user (degrees of freedom) can be detected and used for control operations, etc.

Pivot points 28, which support the rotation of the base 14 around the pivot-axes 22a-22d, are arranged in the corners of the housing 16 which comprises a rectangular shape.

The central axis 11 of the stick 12 defines an axial direction of the stick 12. The stick 12 has a radial extension 15, shown by opposed arrows, from the central axis 11. The radial extension of the stick 12 from the central axis in the direction to each one of the pivot-axes 22a-22d is smaller than the distance of the respective one of the pivot-axes 22a-22d to the center point 13 for all points of the respective one of the pivot-axes 22a-22d.

The central axis 13 of the stick 12 defines, furthermore, an axial direction of the knob 26, and the knob 26 has a radial extension 27, shown by opposed arrows, from the central axis 11. The radial extension 27 of the knob 26 from the central axis 11 in the direction to each one of the pivot-axes 22a-22d is smaller than the distance of the respective one of the pivot-axes 22a-22d to the center point 13 for all points of the respective one of the pivot-axes 22a-22d.

The pivot-axes 22a-22d are placed outside a projection of the stick 12 and/or knob 26 from above to the base 14 meaning that the stick 12 and/or knob 26 cannot be tilted when a force parallel to the central axis of the stick 12 and/or knob 26 is applied. Therefore no rotation of the stick 12/knob 26 and the base 14 around one of the pivot-axes 22a-22d will be initiated when such a force is applied.

Figure 4:
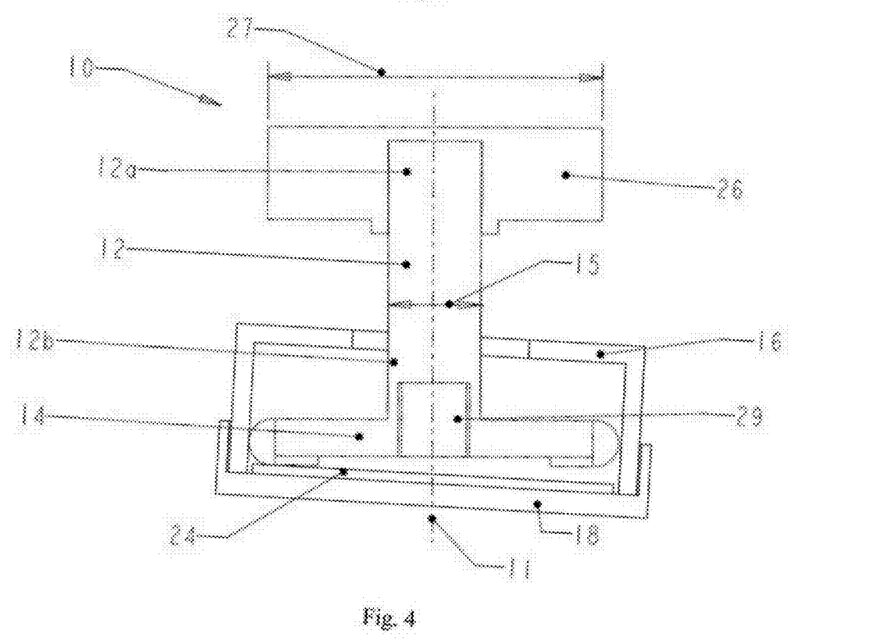
FIG. 4 shows an exemplary joystick according to a second embodiment in a sectional side view with a tilted stick and base.

As can be seen, for example from FIG. 4, a possible second embodiment of a joystick 10 according to the present invention comprises a stick 12, a base 14, where the stick 12 is attached to the base 14, and a housing 16 in which the base 14 is disposed. The housing 16 includes a baseplate 18.

The joystick 10 comprises furthermore one magnet 29, wherein the magnet corresponds to the number of pivot-axes (i.e. four pivot-axes 22a-22d) around which a detection of rotation shall be performed. The magnet 29 is arranged coaxially in the bottom area of the stick 12 and attached to the base 14, and the magnet 29 defines a corresponding pivot-axis 22a-22d around which the base 14 can be rotated relative to the housing 16.

A magnetic element, implemented in the embodiment which is here described, as a plate 24, is made of a (ferromagnetic or ferrimagnetic) magnetic material (for example a magnetic steel). The magnetic element is attached to the baseplate 18 of the housing 16. In alternative embodiments, the plate 24 may be part of the baseplate 18 or may constitute the baseplate 18. The base 14 and the magnet 29 attached to the base 14 are disposed facing the plate 24 and interacting with the plate 24 such that an attractive force is pulling the magnet 29 toward the plate 24. In a zero-position of the stick 12 and the base 14, i.e. in a position in which the stick 12 and the base 14 are not rotated around any one of the pivot axes 22a-22d, the magnet 29 secures the base 14 safely at the plate 24.

A number of sensors (e.g., 21a-21d for detecting the rotation of the base around the pivot-axes 22a-22d are disposed at the baseplate 18 of the housing 16. The sensors are, in the embodiment which is described here, Hall-sensors. In alternative embodiments any other type of sensor may be used, as for example optical sensors, etc.

When, as shown in FIG. 4, a force acting parallel to the base 14 or having a component acting parallel to the base 14 (indicated by an arrow in FIG. 3) is applied to the stick 12, the magnet 29 and the stick 12 are lift up from the plate 24, and the stick 12 and the base 14 are rotated around the corresponding pivot-axis 22a-22d which is defined by the magnet 29. It should be noted that the pivot-axis 22a-22d, which is defined by the magnet 29, is always the one opposite to the direction of the magnet 29 pivoted parallell to the force which is applied to the stick 12. If a force is applied to the stick 12 and to the magnet 29 in the direction north, the part of plate 24 located south of the stick will be lifted up, and the stick 12 and the base 14 will be rotated around the pivot-axis 22a-22d located north of the stick 12 and magnet 29. Since the initial force for lifting up a magnet is quite high no feeling of a free play of the stick 12 in the zero-position can occur.

Figure 5:
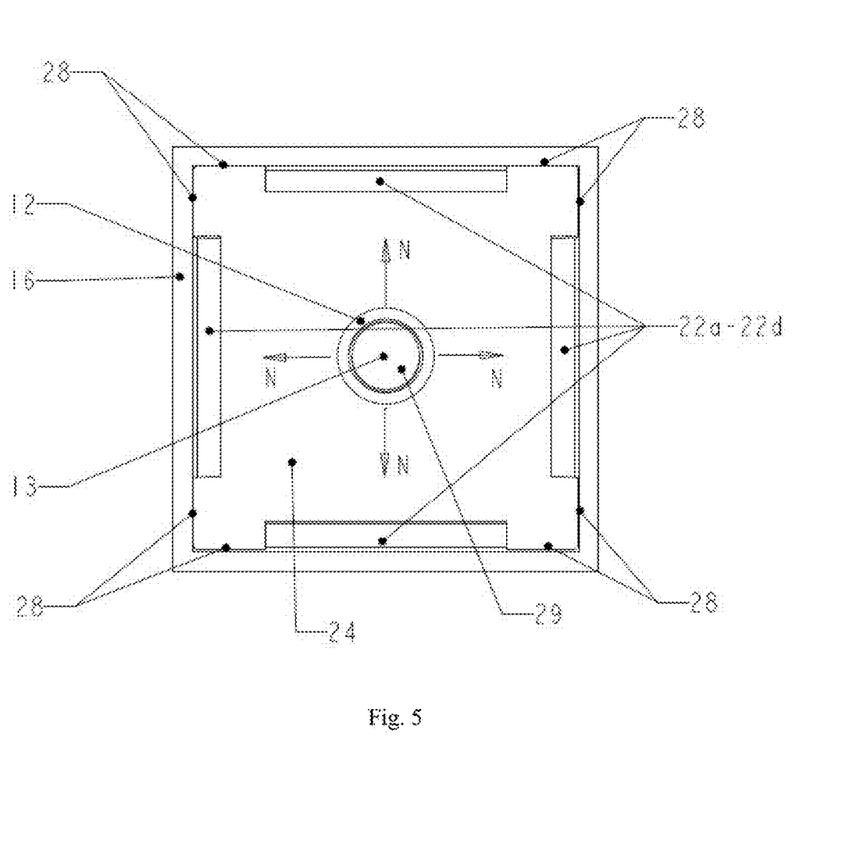
FIG. 5 shows the joystick shown in FIG. 4 in a sectional top view.

The stick 12 extends along a central axis 11 (e.g., as shown in FIG. 4) and the base 14 includes, at least in parts, a plate-like shape. The plate-like shaped part extends in a plane, and the intersection of the central axis 11 of the stick 12 and the plane in which the plate-like shaped part extends defines a center point 13 of the joystick 10 (e.g., as shown in FIG. 5). None of the pivot-axes 22a-22d contains the center point.

The stick 12 and the base 14 are formed integrally and are made of plastic or any other appropriate material. The stick 12 includes a first end 12a and a second end 12b, the second end 12b being attached to the base 14. At the first end 12a, a knob 26 is arranged rotatably around the stick 12. The knob 26 is provided for detecting an amount of rotation of the knob 26 around the stick 12. With the knob, further movements of the user (degrees of freedom) can be detected and used for control operations etc.

Pivot points 28 which support the rotation of the base 14 around the pivot-axes 22a-22d are arranged in the corners of the housing 16 which has a rectangular shape.

The central axis 11 of the stick 12 defines an axial direction of the stick 12. The stick 12 has a radial extension 15, shown by opposed arrows, from the central axis 11. The radial extension of the stick 12 from the central axis 11 in the direction to each one of the pivot-axes 22a-22d is smaller than the distance of the respective one of the pivot-axes 22a-22d to the center point 13 for all points of the respective one of the pivot-axes 22a-22d.

The central axis 13 of the stick defines, furthermore, an axial direction of the knob 26. The knob 26 has a radial extension 27, shown by opposed arrows, from the central axis 11. The radial extension 27 of the knob 26 from the central axis 11 in the direction to each one of the pivot-axes 22a-22d is smaller than the distance of the respective one of the pivot-axes 22a-22d to the center point 13 for all points of the respective one of the pivot-axes 22a-22d.

The pivot-axes 22a-22d are placed outside a projection of the stick 12 and/or knob 26 from above to the base 14 meaning that the stick 12 and/or knob 26 cannot be tilted when a force parallel to the central axis of the stick 12 and/or knob 26 is applied. Therefore, no rotation of the stick 12/knob 26 and the base 14 around one of the pivot-axes 22a-22d will be initiated when such a force is applied.

Figure 2:
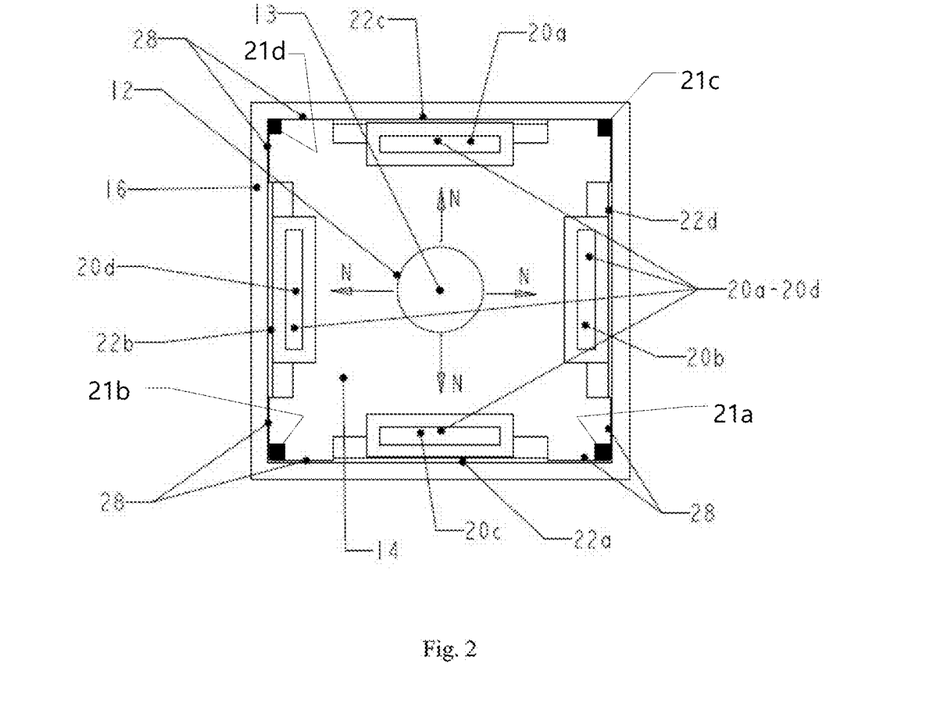
FIG. 2 shows the joystick shown FIG. 1 in a sectional top view.

In both embodiments, according FIGS. 2 and 5 "n" stands for an exemplary number of directions of the movement of stick 12 and—in case of the second embodiment—also of magnet 29. The force to move the stick 12 equates to the force magnet radius R, thus FuLs=FmR.

The invention claimed is:

1. A joystick for detecting a rotation around a predetermined number of pivot-axes comprising:
a stick;
a base, wherein the stick is attached to the base;
a housing in which at least part of the base is disposed, the housing including a baseplate;
a predetermined number of magnets, the predetermined number of magnets corresponding to the predetermined number of pivot-axes, each magnet being attached to the base, and each of the magnets defining a pivot-axis around which the base is capable of being rotated relative to the housing, each respective pivot-axis being defined by a respective one of the magnets that is diametrically opposite to the respective pivot-axis;
a magnetic element comprising a plate made of a magnetic material, the magnetic element being one of attached to the baseplate and integral with the baseplate; and
at least one sensor for detecting rotation of the base around at least one of the predetermined number of pivot-axes,
wherein the base and the magnets attached to the base are disposed facing the magnetic element and are adapted and configured to interact with the magnetic element such that an attractive force pulls the magnets toward the magnetic element.

2. A joystick in accordance with claim 1, wherein the stick extends along a central axis and the base includes a plate-like shaped portion, wherein the plate-like shaped portion extends in a plane, wherein the intersection of the central axis of the stick and the plane in which the plate-like shaped portion extends defines a center point of the joystick, and wherein none of the pivot-axes contains the center point.

3. A joystick in accordance with claim 2, wherein the at least one sensor is one or more of a Hall-sensor and an optical sensor.

4. A joystick in accordance with claim 1, wherein the stick and the base are a single piece formed integrally.

5. A joystick in accordance with claim 1, wherein the stick and the base are made of plastic.

6. A joystick in accordance with claim 1, further comprising pivot points which support the rotation of the base around the pivot-axes.

7. A joystick for detecting a rotation around a predetermined number of pivot-axes comprising:
a stick;
a base, wherein the stick is attached to the base;
a housing in which at least part of the base is disposed, the housing including a baseplate;
a predetermined number of magnets, the predetermined number of magnets corresponding to the predetermined number of pivot-axes, each magnet being attached to the base, and each of the magnets defining a pivot-axis around which the base is capable of being rotated relative to the housing, each respective pivot-axis being defined by a respective one of the magnets that is diametrically opposite to the respective pivot-axis;
a magnetic element comprising a plate made of a magnetic material, the magnetic element being one of attached to the baseplate and integral with the baseplate; and
at least one sensor for detecting rotation of the base around at least one of the predetermined number of pivot-axes,
wherein the base and the magnets attached to the base are disposed facing the magnetic element and are adapted and configured to interact with the magnetic element such that an attractive force pulls the magnets toward the magnetic element, and
wherein the stick comprises a first end and a second end, the first end being attached to the base, and wherein a knob is arranged at the second end and rotatably around the stick such that an amount of rotation of the knob around the stick is capable of being detected.

8. A joystick for detecting a rotation around a predetermined number of pivot-axes comprising:
a stick;
a base, wherein the stick is attached to the base;
a housing in which at least part of the base is disposed, the housing including a baseplate;
a predetermined number of magnets, the predetermined number of magnets corresponding to the predetermined number of pivot-axes, each magnet being attached to the base, and each of the magnets defining a pivot-axis around which the base is capable of being rotated relative to the housing, each respective pivot-axis being defined by a respective one of the magnets that is diametrically opposite to the respective pivot-axis;

a magnetic element comprising a plate made of a magnetic material, the magnetic element being one of attached to the baseplate and integral with the baseplate; and
at least one sensor for detecting rotation of the base around at least one of the predetermined number of pivot-axes,
wherein the base and the magnets attached to the base are disposed facing the magnetic element and are adapted and configured to interact with the magnetic element such that an attractive force pulls the magnets toward the magnetic element, and
wherein the predetermined number of pivot-axes is four and the predetermined number of magnets is four.

9. A joystick for detecting a rotation around a predetermined number of pivot-axes comprising:
a stick;
a base, wherein the stick is attached to the base;
a housing in which at least part of the base is disposed, the housing including a baseplate;
a predetermined number of magnets, the predetermined number of magnets corresponding to the predetermined number of pivot-axes, each magnet being attached to the base, and each of the magnets defining a pivot-axis around which the base is capable of being rotated relative to the housing, each respective pivot-axis being defined by a respective one of the magnets that is diametrically opposite to the respective pivot-axis;
a magnetic element comprising a plate made of a magnetic material, the magnetic element being one of attached to the baseplate and integral with the baseplate; and
at least one sensor for detecting rotation of the base around at least one of the predetermined number of pivot-axes,
wherein the base and the magnets attached to the base are disposed facing the magnetic element and are adapted and configured to interact with the magnetic element such that an attractive force pulls the magnets toward the magnetic element,
wherein the stick extends along a central axis and the base includes a plate-like shaped portion, wherein the plate-like shaped portion extends in a plane, wherein the intersection of the central axis of the stick and the plane in which the plate-like shaped portion extends defines a center point of the joystick, and wherein none of the pivot-axes contains the center point, and,
wherein the central axis of the stick defines an axial direction of the stick, and wherein the stick has a radial extension from the central axis, the radial extension of the stick from the central axis in a direction toward one of the pivot-axes being smaller than any distance of the pivot-axes to the center point for all possible positions of the pivot-axes.

10. A joystick for detecting a rotation around a predetermined number of pivot-axes comprising:
a stick;
a base, wherein the stick is attached to the base;
a housing in which at least part of the base is disposed, the housing including a baseplate;
a predetermined number of magnets, the predetermined number of magnets corresponding to the predetermined number of pivot-axes, each magnet being attached to the base, and each of the magnets defining a pivot-axis around which the base is capable of being rotated relative to the housing, each respective pivot-axis being defined by a respective one of the magnets that is diametrically opposite to the respective pivot-axis;
a magnetic element comprising a plate made of a magnetic material, the magnetic element being one of attached to the baseplate and integral with the baseplate; and
at least one sensor for detecting rotation of the base around at least one of the predetermined number of pivot-axes,
wherein the base and the magnets attached to the base are disposed facing the magnetic element and are adapted and configured to interact with the magnetic element such that an attractive force pulls the magnets toward the magnetic element,
wherein the stick extends along a central axis and the base includes a plate-like shaped portion, wherein the plate-like shaped portion extends in a plane, wherein the intersection of the central axis of the stick and the plane in which the plate-like shaped portion extends defines a center point of the joystick, and wherein none of the pivot-axes contains the center point, and,
wherein the central axis of the stick defines an axial direction of the stick, wherein the stick has a radial extension from the central axis, and wherein the radial extension of the stick from the central axis in a direction toward each one of the pivot-axes is smaller than any distance of the respective pivot-axes to the center point for all possible positions of the respective pivot-axes.

11. A joystick for detecting a rotation around a predetermined number of pivot-axes comprising:
a stick;
a base, wherein the stick is attached to the base;
a housing in which at least part of the base is disposed, the housing including a baseplate;
a predetermined number of magnets, the predetermined number of magnets corresponding to the predetermined number of pivot-axes, each magnet being attached to the base, and each of the magnets defining a pivot-axis around which the base is capable of being rotated relative to the housing, each respective pivot-axis being defined by a respective one of the magnets that is diametrically opposite to the respective pivot-axis;
a magnetic element comprising a plate made of a magnetic material, the magnetic element being one of attached to the baseplate and integral with the baseplate; and
at least one sensor for detecting rotation of the base around at least one of the predetermined number of pivot-axes,
wherein the base and the magnets attached to the base are disposed facing the magnetic element and are adapted and configured to interact with the magnetic element such that an attractive force pulls the magnets toward the magnetic element,
wherein the stick extends along a central axis and the base includes a plate-like shaped portion, wherein the plate-like shaped portion extends in a plane, wherein the intersection of the central axis of the stick and the plane in which the plate-like shaped portion extends defines a center point of the joystick, and wherein none of the pivot-axes contains the center point, and,
wherein the stick comprises a first end and a second end, the first end being attached to the base, wherein a knob is arranged at the second end and rotatably around the stick such that an amount of rotation of the knob around the stick is capable of being detected, and wherein the central axis of the stick defines an axial direction of the knob, the knob having a radial extension from the central axis, the radial extension of the knob from the central axis being in a direction toward each one of the pivot-axes and being a distance smaller than any distance of the respective the pivot-axes to the center point for all possible positions of the pivot-axes.

12. A joystick for detecting a rotation around a predetermined number of pivot-axes comprising:
    a stick;
    a base, wherein the stick is attached to the base;
    a housing in which at least a portion of the base is disposed, the housing including a baseplate;
    a single magnet, which is arranged within the stick and which corresponds to the predetermined number of pivot-axes, the magnet defining a pivot-axis around which the base can be rotated relative to the housing;
    a magnetic element comprising a plate made of a magnetic material, the magnetic element being one of attached to the baseplate and integral with the baseplate; and
    at least one sensor for detecting the rotation of the base around at least one of the predetermined number of pivot-axes,
    wherein the base and the magnet are disposed facing the magnetic element and are adapted and configured to interact with the magnetic element such that an attractive force pulls the magnet toward the magnetic element.

13. A joystick in accordance with claim 12, wherein the stick extends along a central axis and the base includes a plate-like shaped portion, wherein the plate-like shaped portion extends in a plane, wherein the intersection of the central axis of the stick and the plane in which the plate-like shaped portion extends defines a center point of the joystick, and wherein none of the pivot-axes contains the center point.

14. A joystick in accordance with claim 12, wherein the predetermined number of pivot-axes is four.

15. A joystick in accordance with claim 12, further comprising pivot points which support the rotation of the base around the pivot-axes.

16. A joystick for detecting a rotation around a predetermined number of pivot-axes comprising:
    a stick;
    a base, wherein the stick is attached to the base;
    a housing in which at least a portion of the base is disposed, the housing including a baseplate;
    a single magnet, which is arranged within the stick and which corresponds to the predetermined number of pivot-axes, the magnet defining a pivot-axis around which the base can be rotated relative to the housing;
    a magnetic element comprising a plate made of a magnetic material, the magnetic element being one of attached to the baseplate and integral with the baseplate; and
    at least one sensor for detecting the rotation of the base around at least one of the predetermined number of pivot-axes,
    wherein the base and the magnet are disposed facing the magnetic element and are adapted and configured to interact with the magnetic element such that an attractive force pulls the magnet toward the magnetic element,
    wherein the stick extends along a central axis and the base includes a plate-like shaped portion, wherein the plate-like shaped portion extends in a plane, wherein the intersection of the central axis of the stick and the plane in which the plate-like shaped portion extends defines a center point of the joystick, and wherein none of the pivot-axes contains the center point, and,
    wherein the central axis of the stick defines an axial direction of the stick, and wherein the stick has a radial extension from the central axis, the radial extension of the stick from the central axis in a direction toward one of the pivot-axes being smaller than any distance of the pivot-axes to the center point for all possible positions of the pivot-axes.

17. A joystick for detecting a rotation around a predetermined number of pivot-axes comprising:
    a stick;
    a base, wherein the stick is attached to the base;
    a housing in which at least a portion of the base is disposed, the housing including a baseplate;
    a single magnet, which is arranged within the stick and which corresponds to the predetermined number of pivot-axes, the magnet defining a pivot-axis around which the base can be rotated relative to the housing;
    a magnetic element comprising a plate made of a magnetic material, the magnetic element being one of attached to the baseplate and integral with the baseplate; and
    at least one sensor for detecting the rotation of the base around at least one of the predetermined number of pivot-axes,
    wherein the base and the magnet are disposed facing the magnetic element and are adapted and configured to interact with the magnetic element such that an attractive force pulls the magnet toward the magnetic element,
    wherein the stick extends along a central axis and the base includes a plate-like shaped portion, wherein the plate-like shaped portion extends in a plane, wherein the intersection of the central axis of the stick and the plane in which the plate-like shaped portion extends defines a center point of the joystick, and wherein none of the pivot-axes contains the center point, and,
    wherein the central axis of the stick defines an axial direction of the stick, wherein the stick has a radial extension from the central axis, and wherein the radial extension of the stick from the central axis in a direction toward each one of the pivot-axes is smaller than any distance of the respective pivot-axes to the center point for all possible positions of the respective pivot-axes.

18. A joystick for detecting a rotation around a predetermined number of pivot-axes comprising:
    a stick;
    a base, wherein the stick is attached to the base;
    a housing in which at least a portion of the base is disposed, the housing including a baseplate;
    a single magnet, which is arranged within the stick and which corresponds to the predetermined number of pivot-axes, the magnet defining a pivot-axis around which the base can be rotated relative to the housing;
    a magnetic element comprising a plate made of a magnetic material, the magnetic element being one of attached to the baseplate and integral with the baseplate; and
    at least one sensor for detecting the rotation of the base around at least one of the predetermined number of pivot-axes,
    wherein the base and the magnet are disposed facing the magnetic element and are adapted and configured to interact with the magnetic element such that an attractive force pulls the magnet toward the magnetic element, wherein the stick extends along a central axis and the base includes a plate-like shaped portion, wherein the plate-like shaped portion extends in a plane, wherein the intersection of the central axis of the stick and the plane in which the plate-like shaped portion extends defines a center point of the joystick, and wherein none of the pivot-axes contains the center point, and, wherein the stick comprises a first end and a second end, the first end being attached to the base, wherein a knob is arranged at the second end and rotatably around the stick such that an amount of rotation of the knob around the stick is capable of being detected, and wherein the central axis of the stick defines an axial direction of the knob, the knob having a radial extension from the central axis, the radial extension of the knob from the central axis being in a direction toward each one of the pivot-axes and being a distance smaller than any distance of the respective the pivot-axes to the center point for all possible positions of the pivot-axes.

* * * * *